US011005298B2

(12) United States Patent
Smith et al.

(10) Patent No.: US 11,005,298 B2
(45) Date of Patent: May 11, 2021

(54) WIRELESS POWER MAXIMUM EFFICIENCY TRACKING BY SYSTEM CONTROL

(71) Applicant: Integrated Device Technology, Inc., San Jose, CA (US)

(72) Inventors: Nicholaus Smith, La Mesa, CA (US); Rui Liu, Fremont, CA (US); Amit D. Bavisi, Los Gatos, CA (US); Jiangjian Huang, San Jose, CA (US); Gabriel Aungurencei, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 19 days.

(21) Appl. No.: 16/388,476

(22) Filed: Apr. 18, 2019

(65) Prior Publication Data
US 2020/0076235 A1    Mar. 5, 2020

Related U.S. Application Data

(60) Provisional application No. 62/724,519, filed on Aug. 29, 2018.

(51) Int. Cl.
*H02J 50/12* (2016.01)
*H02J 50/80* (2016.01)
*H02J 7/02* (2016.01)

(52) U.S. Cl.
CPC ............. *H02J 50/12* (2016.02); *H02J 7/025* (2013.01); *H02J 50/80* (2016.02)

(58) Field of Classification Search
CPC combination set(s) only.
See application file for complete search history.

(56) References Cited

U.S. PATENT DOCUMENTS 8,129,864 B2   3/2012  Baarman et al.
8,890,470 B2 * 11/2014 Partovi ............... H02J 7/00034
                                                    320/108

(Continued)

FOREIGN PATENT DOCUMENTS

JP    2014-103751 A1   6/2014
WO   2017080865 A1    5/2017

OTHER PUBLICATIONS

European Communication with European Search Report for European Application No. 19194364.6, dated Dec. 17, 2019, pp. 1-7.

(Continued)

*Primary Examiner* — Adam D Houston
(74) *Attorney, Agent, or Firm* — Haynes and Boone, LLP

(57) ABSTRACT

In a wireless power transfer operation, the operating parameters are adjusted to improve efficiency by reducing the transmit and receive coil currents as follows. First, the transmitter causes the receiver to reduce the receive coil current to the lowest value based on the transmitter/receiver communication while still delivering the same amount of power to the load as before the AC current was adjusted to the minimum value. Then the transmitter may change the operating parameters to increase or preserve the power provided to the receiver without decreasing efficiency or with only small decrease in efficiency, or with increasing the efficiency. For example, the transmitter may increase the VBRG voltage (the DC voltage powering the transmit coil) or the operating frequency to maintain or increase output power levels at lower or the same AC and DC current levels. Other features are also provided.

18 Claims, 3 Drawing Sheets

(56) References Cited

U.S. PATENT DOCUMENTS

| | | | | |
|---|---|---|---|---|
| 9,496,732 | B2* | 11/2016 | Partovi | B60L 53/122 |
| 9,722,447 | B2* | 8/2017 | Partovi | B60L 53/126 |
| 9,837,846 | B2* | 12/2017 | Partovi | B60L 53/12 |
| 10,115,520 | B2* | 10/2018 | Partovi | H01F 38/14 |
| 2009/0243397 | A1* | 10/2009 | Cook | H02J 50/12 |
| | | | | 307/104 |
| 2014/0009110 | A1* | 1/2014 | Lee | H02J 50/90 |
| | | | | 320/108 |
| 2016/0094074 | A1 | 3/2016 | Alves et al. | |
| 2016/0329751 | A1 | 11/2016 | Mach et al. | |
| 2017/0149285 | A1* | 5/2017 | Ushijima | H02J 50/12 |
| 2017/0194817 | A1* | 7/2017 | Takatsu | H02J 50/80 |
| 2018/0219405 | A1 | 8/2018 | Qiu et al. | |
| 2018/0241301 | A1* | 8/2018 | Nagaoka | B60L 53/20 |
| 2018/0342878 | A1* | 11/2018 | Nagaoka | H02J 50/12 |
| 2019/0199135 | A1* | 6/2019 | Nagaoka | H02M 7/5387 |
| 2020/0227946 | A1* | 7/2020 | Mao | H02J 7/02 |
| 2020/0235784 | A1* | 7/2020 | Youn | H02J 50/60 |
| 2020/0244108 | A1* | 7/2020 | Kim | H04B 5/0037 |
| 2020/0251929 | A1* | 8/2020 | Partovi | H01F 38/14 |
| 2020/0251937 | A1* | 8/2020 | Park | H04L 5/0055 |
| 2020/0252886 | A1* | 8/2020 | Park | H04W 52/286 |

OTHER PUBLICATIONS

Office Action dated Jan. 5, 2021 issued in related Japanese patent application No. 2019-156286 (5 pages).

* cited by examiner

WIRELESS POWER MAXIMUM EFFICIENCY TRACKING BY SYSTEM CONTROL

CROSS REFERENCE TO RELATED APPLICATIONS

The present application claims priority to U.S. provisional patent application No. 62/724,519, filed Aug. 29, 2018, incorporated herein by reference.

TECHNICAL FIELD

Embodiments of the present invention are related to wireless power systems and, specifically, to wireless power maximum efficiency tracking by system controls.

DISCUSSION OF RELATED ART

Mobile devices, for example smart phones and tablets, are increasingly using wireless power charging systems. Typically, a wireless power charging system includes a transmitter coil that is driven to produce a time-varying magnetic field and a receiver coil that is positioned relative to the transmitter coil to receive the power transmitted in the time-varying magnetic field. Although systems have been designed to deliver required power to the receiver (RX) load, not much attention has been given to maximizing the overall efficiency of the transmit/receiver system as a whole.

Therefore, there is a need to develop better systems for maximizing overall system efficiency.

SUMMARY

This section summarizes some features of the invention. Other features are described in subsequent sections. The invention is defined by the appended claims.

In some embodiments, the wireless power transfer efficiency is improved by reducing the transmit and receive coil currents as follows. First, the transmitter causes the receiver to reduce the receive coil current to a small value based on the transmitter/receiver communication. Then the transmitter changes the operating parameters to increase the power provided to the receiver without decreasing efficiency or with only small decrease in efficiency. For example, the transmitter may increase the VBRG voltage (the DC voltage powering the transmit coil) or the operating frequency.

In some embodiments, a method for operating a wireless power transmitter is provided in a wireless power transfer operation in which power is transferred wirelessly via a magnetic field generated by an inductor of the transmitter (e.g. induction coil) and inducing an AC current in an inductor of a wireless power receiver. The method comprises:

the transmitter causing the AC current to have a first value; then the transmitter increasing an output power of the transmitter's inductor to increase an output power of the receiver.

Some embodiments provide transmitters configured to perform the methods described above and below.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
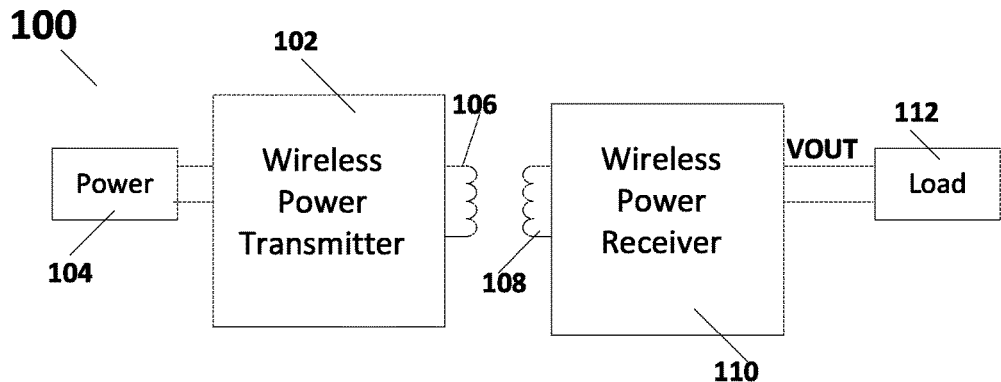
FIGS. 1 and 2 illustrate wireless power transmission systems according to some embodiments.

FIG. 1 illustrates a system 100 for wireless transfer of power. As illustrated in FIG. 1, a wireless power transmitter 102 drives a coil 106 to produce a magnetic field. A power supply 104 provides power to wireless power transmitter 102. Power supply 104 can be, for example, a battery based supply or may be powered by alternating current, for example 120V at 60 Hz. Wireless power transmitter 102 drives coil 106 at, typically, a range of frequencies, typically according to one of the wireless power standards. Embodiments of the present invention may be used with any of the wireless power standards, or with any wireless power transmission system.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium, the Qi specification, a resonant inductive coupling system is utilized to charge single devices at the resonance frequency of the device. In the Qi standard, coil 108 is placed in close proximity with coil 106 while in the A4WP standard, coil 108 is placed near coil 106 along with other coils that belong to other charging devices. FIG. 1 depicts a generalized wireless power system 100 that operates under any of these standards or in some other way.

As is further illustrated in FIG. 1, the magnetic field produced by coil 106 induces an AC current in coil 108, which results in power being received in a receiver 110. Receiver 110 provides power to a load 112, which may be a battery charger and/or other components of a mobile device. Receiver 110 typically includes rectification to convert the received AC power to DC power for load 112.

Current wireless power systems are controlled based on the Rx load 112, and the operating point is a function of the power demanded by the receiver 110. As such, the operating point is adjusted to meet Rx power requirements and is not always optimal in terms of reducing power consumption. The efficiency is a byproduct of the operating point, which is a function of the Tx VIN (a DC voltage generated by transmitter 102 from the output of power supply 104), or VBRG (a DC voltage generated by transmitter 102 from VIN and converted by a bridge inverter to AC current driven through coil 106), the resonance frequencies of the resonance tanks (Tx and Rx) formed with the coils 106 and 108, the operating frequency limitations, and the Rx output voltage VOUT and power POUT that are delivered to load 112.

Since the parameters that dictate efficiency have been for the most part set by the product definition, they are not adjustable to maximize efficiency in a particular power transfer operation, and therefore efficiency has been a byproduct of the fixed, pre-set parameters. Previous efforts at increasing efficiency have been focused on coil design (reductions of DCR (DC resistance) and ACR (AC resistance), and ferrite permeability changes), increasing the output voltage (VOUT) and input voltage (VIN) to higher fixed values, and selecting components with better performance and lower power losses (which may increase the cost of the system).

However, in some embodiments of the present invention, efficiency can be increased by actively adjusting, rather than pre-setting and keeping fixed, operating parameters such as the operating frequency, the VBRG voltage, and the VOUT voltage.

Figure 2:
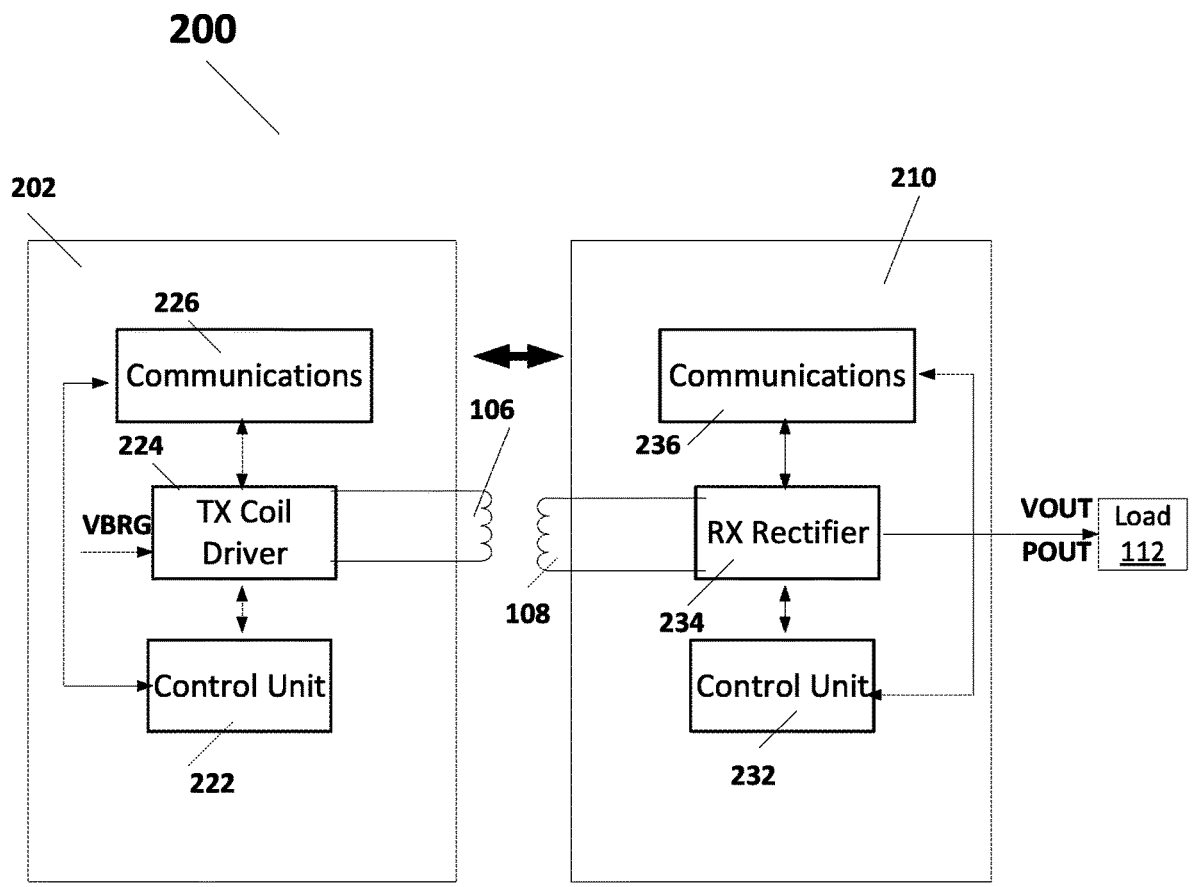

FIG. 2 illustrates an example wireless power transfer system 200, having a transmitter 202 and a receiver 210 that can perform according to some embodiments of the present invention. As illustrated in FIG. 2, transmitter 202 includes a control unit 222 that is coupled to control a TX coil driver 224. Driver 224 is coupled to drive TX coil 106 with AC current. Control unit 222 is also coupled to receive and send data, possibly in packet form, through communications 226. Communications 226 can, for example, transmit data to receiver 210 using a frequency modulation technique and receive data from receiver 210 that has been modulated with an amplitude modulation technique.

Similarly, receiver 210 includes a control unit 232 coupled to control operation of a RX rectifier 234, which is coupled to Rx coil 108. Control unit 232 is coupled to communications 236 which receives and sends data to transmitter 202 as described above. Control unit 222 and/or control unit 232 can be any processing system (microcontroller, memory, supporting circuitry) capable of operating transmitter 202 and receiver 210, respectively.

Figure 3:
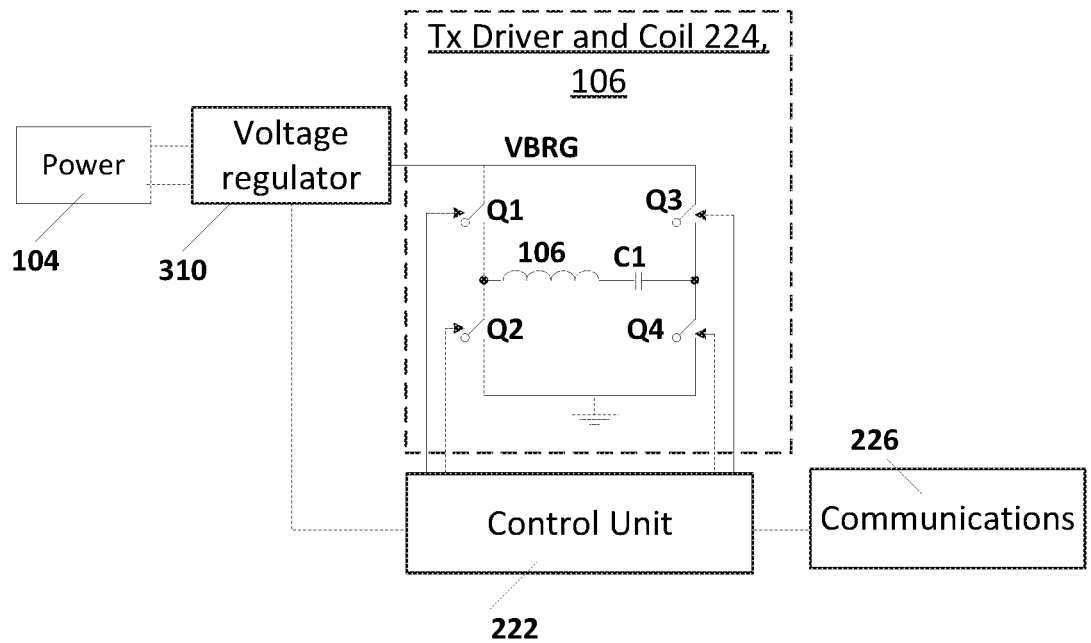
FIG. 3 illustrates a wireless power transmission transmitter according to some embodiments.
Figure 4:
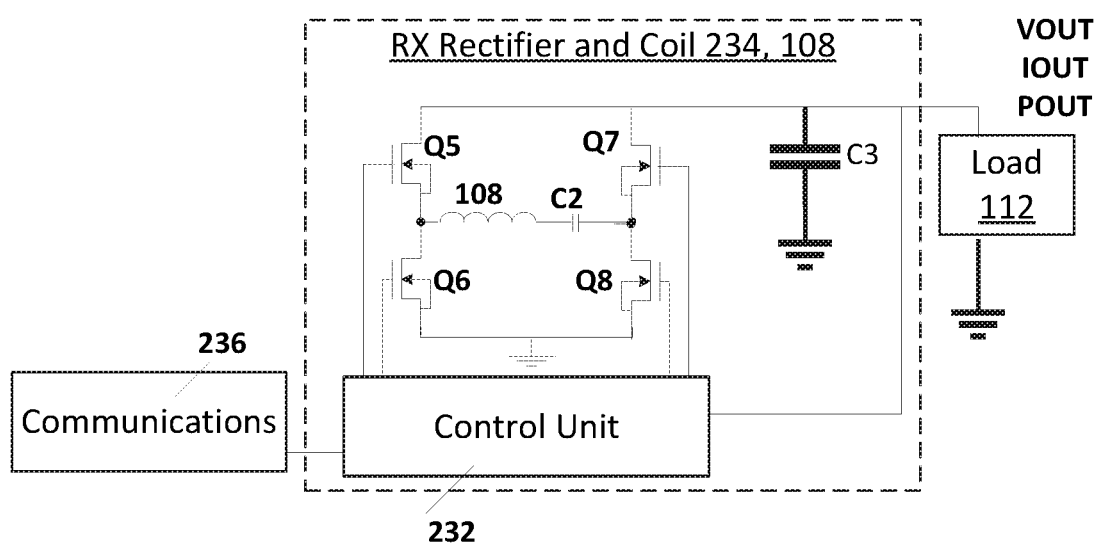
FIG. 4 illustrates a wireless power transmission receiver according to some embodiments.

A transmitter 202 example is shown in more detail in FIG. 3. A receiver 210 example is shown in more detail in FIG. 4.

System 200 is controlled to set the operating point by adjusting the VBRG and/or VOUT voltages according to the Rx output power POUT and the relative position on the Tx to maximize the efficiency. This is in contrast to fixing these key parameters and accepting the efficiency that results.

In order to realize this scheme, the Rx 210 reports its output voltage VOUT, and/or output current IOUT, and/or Rx output power POUT, to transmitter 202 to enable TX 202 to estimate the Rx power. (In some embodiments, the Rx report is made by transmitting a Reported Power Packet (RPP).) A voltage regulator 310 in TX 202 (FIG. 3) can be used to adjust VBRG and/or VIN to force Rx 210 to request power level changes that result in the Tx 202 operating at the highest operating frequency, which in turn increases the inductive coupling of coils 106, 108 and allows the system to operate to deliver the same power level POUT with the minimum current flowing through the Tx and Rx resonance tanks. In particular, the voltages VIN and/or VOUT can be set by voltage regulator 310 to minimize the Tx coil 106 current I_Tx_coil, which is related to the mutual inductance (M) as follows:

$$V\_Rx\_coil = 2\pi * f * M * I\_Tx\_coil \quad (1)$$

where V_Rx_coil is the voltage (EMF) across the receive coil 108; and f is the operating frequency (in Hz). V_Rx_coil and I_Tx_coil can be viewed as RMS (root mean square) values. Efficiency drops when I_Tx_coil or I_Rx_coil increases. The coil power loss is given by:

$$Loss = I\_Tx\_coil^2 * ACR\_TX + I\_Rx\_coil^2 * ACR\_RX \quad (2)$$

where: I_Tx_coil is the RMS (root mean square) current in transmit coil 106; I_Rx_coil is the RMS current in receive coil 108; ACR_TX is the ACR (AC resistance) of transmit coil 106; ACR_RX is the ACR of receive coil 108. Also, the higher the AC currents, the higher the DC current in the Tx becomes which increases losses in any components from the Tx power source to the Tx coil with a proportional relationship. Therefore, reducing the transmit and receive coil currents I_Tx_coil, I_Rx_coil would reduce the energy losses and increase the power transfer efficiency.

In some embodiments, the coil currents I_Tx_coil, I_Rx_coil are reduced while still delivering a high output power POUT to the load 112 using the operating point based on the receiver-transmitter communication because the voltages are all increased.

In the exemplary transmitter of FIG. 3, voltage regulator 310 converts the power signal from power supply 104 to DC voltages VIN, VBRG (possibly under 5.0V; the invention is not limited to particular voltage values or other parameter values, which are provided for illustration). The voltage VBRG is input to a bridge inverter formed by switches Q1 through Q4 (possibly bipolar or field-effect transistors, e.g. NMOS). These switches, controlled by control unit 222, form two pairs (Q1,Q4) and (Q2,Q3); one switch pair is open while the other one is closed, by control unit 222, at the operating frequency f. As a result, AC current I_Tx_coil flows between the VBRG terminal and ground through a resonant tank formed by coil 106 and capacitor C1. The current amplitude, and hence the amplitude and rate of change (at a given operating frequency) of the magnetic field generated by the current, can be adjusted by adjusting the VBRG voltage for a given operating frequency and resonance tank.

In receiver 210 (FIG. 4), coil 108 and capacitor C2 form a resonant tank, whose AC current I_Rx_coil is rectified by rectifier 234. In the particular example shown, rectifier 234 is a synchronous rectifier including the transistors Q5 through Q8 controlled by control unit 232 (also in pairs or other combination to maximize efficiency and stability). The rectifier output is provided to load 112. A capacitor C3, and possibly other transmitter and receiver components, can be included to provide suitable operating parameters and functions.

Figure 5:
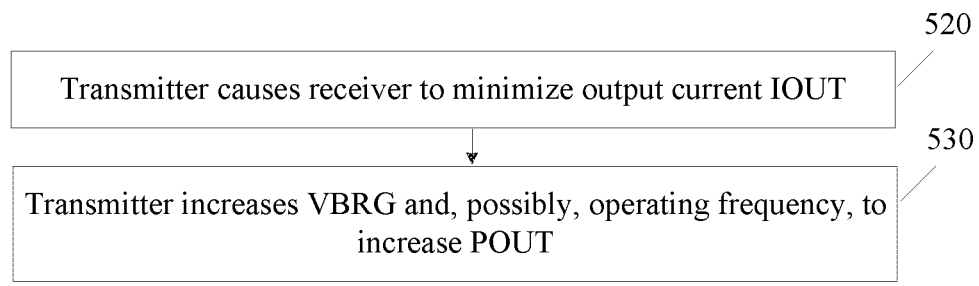
FIG. 5 is a flowchart of a wireless power transmission operation according to some embodiments.

During the power transfer operation, and possibly immediately before the power transfer itself, TX 202 and RX 210 communicate with each other to set the operating parameters. As shown at step 520 in FIG. 5, the transmitter causes the receiver to reduce the receive coil current I_Rx_coil to some minimal value. For example, in some embodiments, the communication protocol allows the transmitter to command the receiver to reduce the I_Rx_coil current to the minimal value at which the output current IOUT reaches zero or near zero, but does not stay at zero for any significant length of time. If the output current stayed at zero for a significant length of time, then the output power would be zero during this length of time, so efficiency would be zero and all power needed to maintain the wireless connection would be consumed with no power delivered.

The receiver can reduce its coil current I_Rx_coil by reducing the duty cycle of transistors Q5-Q8 for example, or by reducing the transistors' gate voltages.

In other embodiments, step 520 is performed as follows. The receiver's control unit 232 monitors the VOUT and/or IOUT and/or POUT and/or I_Rx_Coil value(s), and periodically provides those values to transmitter 202. The transmitter gradually reduces the output power of coil 106 while monitoring the values received from the receiver, until those values indicate the minimal receive coil current I_Rx_coil, and/or until the receiver requests the transmitter to increase the output power. (The transmitter can reduce its output power by reducing VBRG, and/or the operating frequency, and/or the duty cycle and/or gate voltages of switches Q1-Q4 for example; in some embodiments however, the duty cycle is kept at 50%, and the operating frequency f is kept within certain bounds, e.g. depending on the transmitter's resonant tank frequency.) While the transmitter reduces the output power, the receiver attempts to maximize its output voltage and current VOUT, IOUT by operating the rectifier at 50% duty cycle with the maximum gate voltages.

Then (step 530), the transmitter increases its output power, for example by increasing the VBRG voltage, and/or operating frequency, and/or the bridge inverter's duty cycle and/or gate voltages. As a result, VOUT and POUT increase to desired values. The coil currents I_Tx_coil, I_Rx_coil also increase, but this increase is minimal relative to efficiency improvements because of first minimizing the I_Rx_coil current at step 520 as described above.

The VBRG adjustment may continue throughout the power transfer operation, based on the receiver's reports of the VOUT and/or IOUT and/or POUT and/or I_Rx_coil parameters. In particular, steps 520 and 530 are periodically repeated during the power transfer.

In some embodiments, the transmitter and/or receiver duty cycles are fixed at 50% throughout, and are not changed at steps 520 and 530.

Some embodiments are defined by the following clauses:

Clause 1 defines a method for operating a wireless power transmitter in a wireless power transfer operation in which power is transferred wirelessly via a magnetic field generated by an inductor (e.g. coil 106) of the transmitter and inducing an AC current in an inductor (e.g. coil 108) of a wireless power receiver, the method comprising:

the transmitter causing the AC current to have a first value (for example, a low I_Rx_coil value at step 520); then the transmitter increasing an output power of the transmitter's inductor (e.g. at step 530, possibly by increasing VBRG and/or the operating frequency) to increase an output power (e.g. POUT) of the receiver.

2. The method of clause 1 wherein the transmitter increasing the output power of the transmitter's inductor comprises increasing a DC voltage (e.g. VBRG) that provides power to the transmitter's inductor.

3. The method of clause 1 or 2 wherein the transmitter increasing the output power of the transmitter's inductor comprises increasing a frequency (e.g. operating frequency) of an AC current through the transmitter's inductor.

4. The method of any preceding clause wherein the transmitter causing the AC current in the receiver's inductor to have a first value comprises the transmitter sending to the receiver a command to reduce the receiver's inductor's AC current to a minimal value.

5. The method of clause 4 wherein said sending a command is performed in a wireless communication with the receiver.

6. The method of any preceding clause wherein the transmitter causing the AC current in the receiver's inductor to have a first value comprises the transmitter reducing the output power of the transmitter's inductor until receiving a first indication from the receiver.

7. The method of clause 6 wherein the first indication is received in a wireless communication with the receiver.

8. The method of clause 6 or 7 wherein the first indication indicates a minimal current amplitude in the receiver's inductor (the minimal current amplitude may be indicated by the receiver sending the I_Rx_coil value and/or POUT and/or VOUT and/or IOUT values).

9. The method of clause 6, 7, or 8 wherein the first indication is a request to increase the transmitter's inductor's output power.

The invention includes a transmitter configured to perform the methods described above, e.g. having a controller 222 suitably configured in a hardwired and/or software-programmed manner.

The above detailed description is provided to illustrate specific embodiments of the present invention and is not intended to be limiting. Numerous variations and modifications within the scope of the present invention are possible. The present invention is set forth in the following claims.

What is claimed is:

1. A method for operating a wireless power transmitter in a wireless power transfer operation in which power is transferred wirelessly via a magnetic field generated by an inductor of the transmitter and inducing an AC current in an inductor of a wireless power receiver, the method comprising:
   the transmitter communicating with the receiver to receive a value indicating the AC current in the inductor of the wireless power receiver;
   the transmitter minimizing the AC current to a first value based on the value by reducing current through the transmitter's inductor; then
   the transmitter increasing an output power of the transmitter's inductor to increase an output power of the receiver to a desired value.

2. The method of claim 1 wherein the transmitter increasing the output power of the transmitter's inductor comprises increasing a DC voltage that provides power to the transmitter's inductor.

3. The method of claim 1 wherein the transmitter increasing the output power of the transmitter's inductor comprises increasing a frequency of an AC current through the transmitter's inductor.

4. The method of claim 1 wherein the transmitter causing the AC current in the receiver's inductor to have a first value comprises the transmitter sending to the receiver a command to reduce the receiver's inductor's AC current to a minimal value by adjusting through communication an operating point to cause operation at a highest possible operating frequency or highest possible voltages.

5. The method of claim 4 wherein said sending a command is performed in a wireless communication with the receiver.

6. The method of claim 1 wherein the transmitter causing the AC current in the receiver's inductor to have a first value comprises the transmitter reducing the output power of the transmitter's inductor until receiving a first indication from the receiver.

7. The method of claim 6 wherein the first indication is received in a wireless communication with the receiver.

8. The method of claim 6 wherein the first indication indicates a minimal current amplitude in the receiver's inductor.

9. The method of claim 6 wherein the first indication is a request to increase the transmitter's inductor's output power.

10. A wireless power transmitter comprising:
 an inductor for generating a magnetic field thereby inducing an AC current in an inductor of a wireless power receiver;
 a controller configured to:
 receive a value from the wireless power receiver, the value being indicative of the AC current in the inductor of the wireless power receiver;
 cause, based on the value, the AC current to be reduced to a first value by decreasing an output power of the transmitter's inductor for generating the magnetic field; then
 increase the output power of the transmitter's inductor to increase an output power of the receiver to a desired value.

11. The transmitter of claim 10 wherein the transmitter increasing the output power of the transmitter's inductor comprises increasing a DC voltage that provides power to the transmitter's inductor.

12. The transmitter of claim 10 wherein the transmitter increasing the output power of the transmitter's inductor comprises increasing a frequency of an AC current through the transmitter's inductor.

13. The transmitter of claim 10 wherein the transmitter causing the AC current in the receiver's inductor to have a first value comprises the transmitter sending to the receiver a command to reduce the receiver's inductor's AC current to a minimal value while delivering the same amount of output power.

14. The transmitter of claim 13 wherein said sending a command is performed in a wireless communication with the receiver.

15. The transmitter of claim 10 wherein the transmitter causing the AC current in the receiver's inductor to have a first value comprises the transmitter reducing the output power of the transmitter's inductor until receiving a first indication from the receiver.

16. The transmitter of claim 15 wherein the first indication is received in a wireless communication with the receiver.

17. The transmitter of claim 15 wherein the first indication indicates a minimal current amplitude in the receiver's inductor.

18. The transmitter of claim 15 wherein the first indication is a request to increase the transmitter's inductor's output power.

* * * * *